Patented May 31, 1932

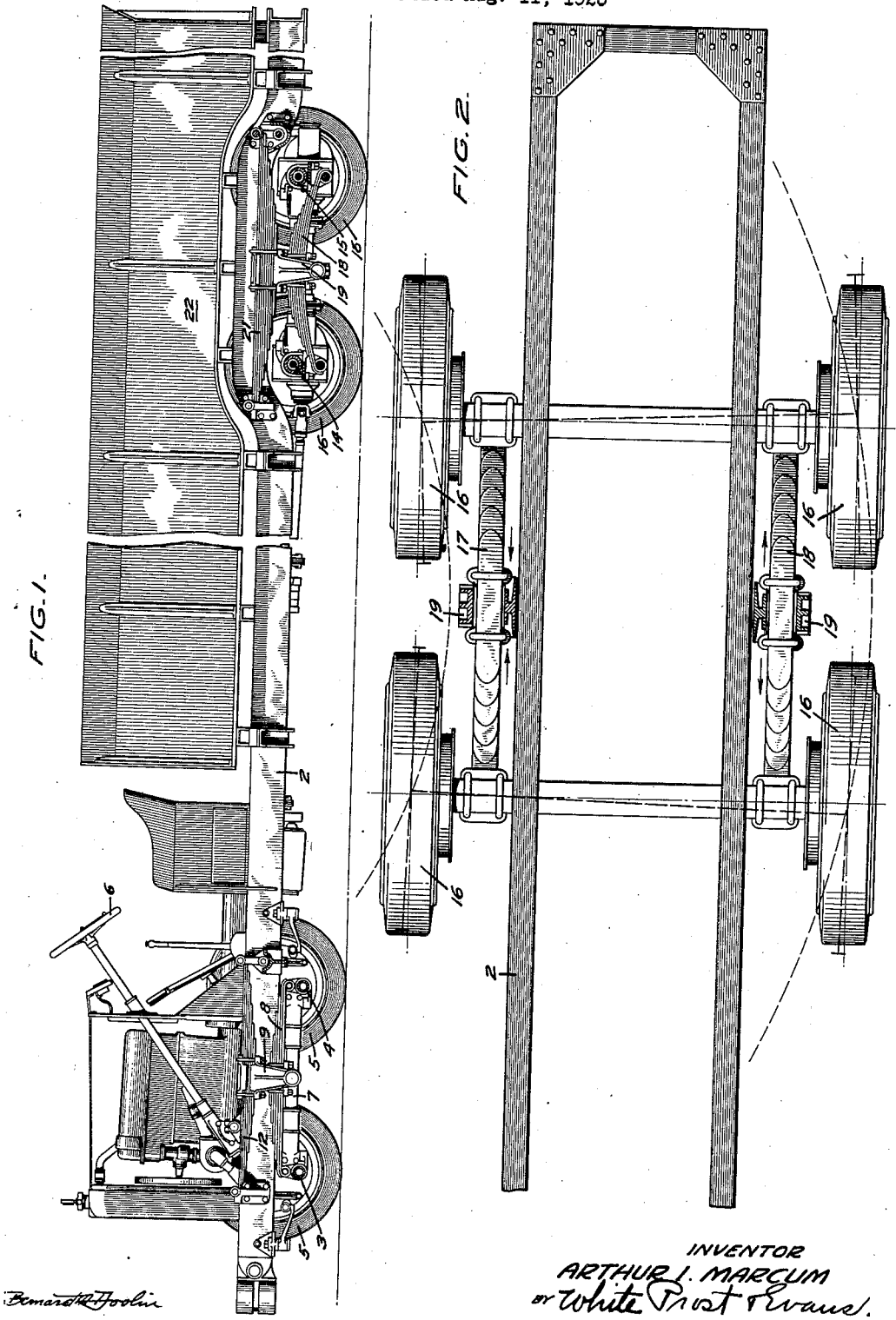

1,860,471

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

ROAD VEHICLE

Application filed August 11, 1923. Serial No. 656,875.

The invention relates to road vehicles and particularly to the spring suspension of such vehicles.

The invention further relates to a road vehicle having a tandem rear axle construction.

An object of the invention is to provide a spring suspension for a tandem axle vehicle which facilitates the steering of the vehicle.

Another object of the invention is to provide a spring suspension for a tandem axle vehicle which operates automatically to assist in steering the vehicle and taking the drag out of the four rear wheels as the vehicle rounds a turn.

The invention possesses other advantageous features some of which, with the foregoing, will be set forth at length in the following description, where I shall outline in full that form of my invention which I have selected for illustration in the drawings accompanying and forming part of the present specification. In said drawings I have shown one embodiment of my invention but it is to be understood that I do not limit myself to such form, since the invention, as set forth in the claims, may be embodied in a plurality of forms.

Referring to said drawings:

Figure 1 is a longitudinal section through a road vehicle embodying my invention, parts thereof being broken away to reduce the size of the figure.

Figure 2 is a plan or top view of the rear end of the vehicle indicating the action of the springs in assisting to steer the vehicle.

My present invention is particularly adapted to multi-wheel vehicles, that is vehicles having six, or eight or more wheels and in which the axles are arranged in tandem. Vehicles of this nature are usually very long and the steering devices are usually located on the front wheels, so that the rear wheels have a certain amount of drag as the vehicle makes a turn. In accordance with the present invention the rear non-dirigible wheels are shifted slightly from their planes of parallelism, as the vehicle makes a turn, to substantially eliminate the drag. This not only facilitates steering but also greatly reduces the wear on the tires.

The vehicle of my invention comprises a suitable frame 2 provided at its front end with axles 3—4 on which are arranged the dirigible wheels 5 which are turned by the steering wheel 6. The front axles 3—4 are held in definite, fixed position with respect to each other, transversely, that is the spread of the axles 3—4 is maintained constant, by a torque bar or radius bar 7 connecting the two axles together. The axles are further connected together by the flat leaf springs 8 which are fulcrumed at their centers on the brackets 9 which are secured to the centers of the flat leaf springs 12. The flat spring 12 is connected at its ends to the vehicle frame. It is to be understood that there is a spring assembly consisting of the springs 8 and 12 and their associated parts at each side of the frame, the springs 8 connecting the axles together adjacent the ends of the axles.

Disposed below the rear end of the frame are the rear axles 14—15 which in the present construction, constitute the driving axles. Arranged on these axles are the non-dirigible driving wheels 16. The axles 14—15 are connected together by upwardly bowed semi-elliptic leaf springs 17—18, there being one leaf spring on each side of frame. These leaf springs are preferably pivotally connected at their ends to brackets secured to the axles 14—15 and are connected intermediate their ends, preferably at the center thereof to the vehicle frame. Each bowed spring is fulcrumed at its center on a bracket 19 which is clamped to the central portion of a flat leaf spring 21 overlying the bowed spring and connected at its end to the vehicle frame. The axles 14—15 are normally parallel and the drive wheels 16 on each side of the vehicle normally lie in the same vertical plane. The axles are arranged so that the spread or the distance between the axles may be varied and by virtue of the spring construction the spread of the axles at the two ends is differentially varied so that the drive wheels 16 are moved from their common plane into a position in which they are slightly inclined with respect to each other. When the upwardly bowed leaf spring on one side of the vehicle is flattened more than the corresponding spring on the other side of the vehicle, the axles on the first side of the vehicle are spread apart a greater distance than they are on the other side of the vehicle. This produces a condition of non-parallelism or inclination of the axles with respect to each other and a corresponding position of the drive wheels. In Figure 2 I have shown in dotted lines, the positions of the axles and wheels when the bowed spring 18 is flattened to a greater extent than the spring 17. This occurs when the vehicle is making a turn. The centrifugal force due to the weight of the load or body 22 of the vehicle shifts the greater portion of the load to the spring lying on the outside of the curve so that such spring is flattened and the axles at that side of the vehicle spread apart a greater distance. This causes a movement of the wheel planes wih respect to each other so that the wheels tend to follow around the curve, taking the drag out of the rear wheels. In making a turn, the body tilts toward the outside of the turn, flattening the bowed spring on that side to a greater extent than on the inside with the result that the axles and wheels are positioned as shown in the dotted lines in Figure 2. In Figure 2 also I have indicated in dotted lines the curve around which the vehicle is traveling and it may be noted that the wheels mounted on the front rear axle 14 are turned to follow the curve and the wheels on the rear axle 15 are turned so that they track with the wheels on the axle 14. Thus the rear wheels are automatically shifted sufficiently, as the vehicle passes around a turn, to take the drag out of the rear wheels and to render steering of the vehicle less arduous. The springs connecting the front axles are flat so that difference in flexure of these springs does not vary the spread of the front axle. In the rear, however the springs are purposely upwardly bowed even under normal load, so that the centrifugal force, due to the weight of the load as the vehicle rounds a curve, causes the axles to be differentially spread at their two ends to facilitate steering and to take the drag out of the rear wheels.

Rear spring beams 17 and 18 preferably have their ends slung below the drive axles and their middle portions upwardly bowed to such extent that said portions are disposed substantially in the plane of the axes of wheel rotation. This results in springs of just the right curvature and mounting to give proper steering action under average conditions. The resulting curvature is such that the springs are not too sharply bowed under normal load conditions when the vehicle is traveling in a straight path, and yet they rarely, if ever, change from convex to concave shape when the vehicle is moving around sharp curves at relatively high speed. The range of spring deflection is between the position illustrated and that position in which the springs deflect until they are straight (maximum steering action). In other words, a maximum steering action without detrimental counter influences is secured with a minimum of spring deflection, by utilizing a convex spring with its upper portion substantially in the plane of the axes of wheel rotation.

Each upper spring of the suspension, as aforestated, preferably is normally flat (i. e. horizontally arranged) and directly pivoted at its forward end on the frame. With this arrangement the bracket 19 and its trunnion swing substantially vertically during operation along the most vertical portion of a circle drawn about the direct spring pivot; whereas if the spring 21 were curved the swinging movement would take place about a more horizontal portion of the circle, with the result that the spring 18 and wheels 16 would have a material longitudinal movement (relative to the frame) imparted to them to cause interference with the proper steering action. Moreover, the utilization of a flat spring 21 in combination with an upwardly bowed spring 18 the top of which is located substantially in the plane of the axles, provides a compact suspension which permits the vehicle frame to be disposed closely adjacent the ground. This is important because a low center of gravity and a low load distribution greatly enhance the automatic steering characteristics of the assembly.

The feature of connecting the ends of spring 18 beneath the wheel axes and likewise disposing the central trunnion below the wheel axes, is of prime importance. As just stated a low concentration of load enhances the steering action of the non-dirigible wheels. Independently of the steering, however, it produces a proper load distribution and a very stable suspension because the load is completely underslung with respect to the axles. Furthermore, when one or both of the axles are driven, and particularly when the pivots of spring 18 and the trunnion carried by bracket 19 are all disposed substantially in a common horizontal plane, as illustrated, the longitudinal pushing and pulling components of the driving forces are effectively transmitted directly from the axle-carried spring pivots to the central load-supporting trunnion.

I claim:

1. In a road vehicle, a frame, a body on said frame, a pair of axles having a fixed spread disposed below the front part of the frame, dirigible wheels on said axles, a pair of axles disposed below the rear end of the frame, said axles being free of restricting connections that prevent their movement to positions of non-parallelism in a horizontal plane, non-dirigible wheels on said axles and upwardly bowed leaf springs on both sides of the frame connected at their ends to the latter axles, a flat leaf spring connected at its ends to the frame associated with each bowed spring and means connecting the flat and bowed springs of each pair together at their centers, differential flexure of the upwardly moved springs serving to move the axles to positions of non-parallelism in the horizontal plane.

2. In a road vehicle, a frame, a body on said frame, a pair of axles having a fixed spread disposed below the front part of the frame, dirigible wheels on said axles, a pair of axles disposed below the rear end of the frame, said axles being free of restricting connections that prevent their movement to positions of non-parallelism in a horizontal plane, non-dirigible wheels on said axles and upwardly bowed leaf springs on both sides of the frame connected at their ends to the latter axles, a flat leaf spring connected at its ends to the frame associated with each bowed spring, a bracket secured to each flat spring at its center and a stub shaft on which the bowed spring is fulcrumed, carried by said bracket, differential flexure of the upwardly moved springs serving to move the axles to positions of non-parallelism in the horizontal plane.

3. A road vehicle including tandem axles movable toward and from each other, a pair of non-dirigible wheels on each axle, a frame, springs connected at their ends to said axles by connections arranged beneath said axles, said springs being bowed upwardly to bring the mid portions thereof substantially in the plane containing the axes of the axles, trunnions secured to said portions, and resilient means to yieldingly connect said trunnions to said frame.

4. The combination defined in claim 3 in which the last named means comprises substantially flat springs secured to said frame at their ends and connected to the trunnions at their mid portions.

5. A road vehicle including a frame; tandem axles disposed substantially in parallelism adjacent one end of said frame; a set of non-dirigible wheels on the ends of each axle; springs longitudinally disposed adjacent said wheels near the outer sides of said frame with their mid-portions substantially midway between and closely adjacent the horizontal plane of the tandem axles; means for pivotally supporting the mid-portions of said springs on said frame; means connecting the spring ends with the corresponding axle ends to prevent substantially all relative movement therebetween longitudinally of the frame, whereby each spring end and its connected axle end are caused to move in unison as the springs change in length when they deflect; said springs being constructed and assembled with their midportions bowed appreciably upwardly even when the vehicle is under normal load, whereby as the vehicle is operated over a curved path of travel to shift a greater portion of the load from one side of the vehicle to the other, one spring will elongate and the other will shorten, with resultant automatic steering of the tandem axles.

6. A road vehicle including tandem axles movable toward and from each other, a pair of non-dirigible wheels on each axle, a frame, springs connected at their ends to said axles by connections arranged beneath said axles, said springs being of such length as to maintain said axles substantially as close together as their corresponding sets of wheels will permit, said springs also being bowed upwardly to bring the midportions thereof substantially into the plane containing the axes of the axles, trunnions supported by said portions on the lower sides thereof, and means interconnecting said frame and said trunnions.

In testimony whereof, I have hereunto set my hand.

ARTHUR I. MARCUM.